United States Patent
Ichikawa

(10) Patent No.: US 12,097,573 B2
(45) Date of Patent: Sep. 24, 2024

(54) LASER PROCESSING METHOD AND PREFORM

(71) Applicant: Yoichi Ichikawa, Kanagawa (JP)

(72) Inventor: Yoichi Ichikawa, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 18/078,104

(22) Filed: Dec. 9, 2022

(65) Prior Publication Data

US 2023/0201967 A1    Jun. 29, 2023

(30) Foreign Application Priority Data

Dec. 23, 2021    (JP) ................. 2021-209856

(51) Int. Cl.
*B29C 49/00* (2006.01)
*B23K 26/359* (2014.01)
*B23K 103/00* (2006.01)

(52) U.S. Cl.
CPC .......... *B23K 26/359* (2015.10); *B29C 49/071* (2022.05); *B23K 2103/42* (2018.08); *B29C 2949/0724* (2022.05)

(58) Field of Classification Search
CPC ............ B29C 49/071; B29C 49/42412; B29C 2949/0715; B29C 2795/002; B29C 2795/007; B29C 49/42413; B29C 2949/0724; B23K 26/359; B23K 2103/42; B29L 2031/7158
See application file for complete search history.

(56) References Cited

U.S. PATENT DOCUMENTS

| | | | |
|---|---|---|---|
| 6,461,380 B1* | 10/2002 | Cox | A61F 2/915 623/1.15 |
| 2011/0089135 A1 | 4/2011 | Simon et al. | |
| 2019/0070771 A1 | 3/2019 | Feuilloley et al. | |
| 2020/0198214 A1 | 6/2020 | Rizzo et al. | |
| 2021/0402805 A1 | 12/2021 | Tamura et al. | |
| 2022/0097414 A1 | 3/2022 | Hirayama et al. | |
| 2022/0118553 A1 | 4/2022 | Miyanishi et al. | |
| 2022/0266392 A1 | 8/2022 | Hirayama et al. | |
| 2022/0276042 A1 | 9/2022 | Fujita et al. | |
| 2022/0305812 A1 | 9/2022 | Funahashi et al. | |

FOREIGN PATENT DOCUMENTS

| | | |
|---|---|---|
| DE | 10 2017 120 201 A1 | 3/2019 |
| JP | 2021-176648 | 11/2021 |
| JP | 2022-015739 | 1/2022 |
| JP | 2022-035975 | 3/2022 |
| JP | 2022-035976 | 3/2022 |
| JP | 2022-056333 | 4/2022 |
| JP | 2022-057612 | 4/2022 |
| JP | 2022-058127 | 4/2022 |
| JP | 2022-086838 | 6/2022 |

OTHER PUBLICATIONS

Extended European Search Report issued Jun. 9, 2023, in corresponding European Patent Application 22211851.5, 10pp.

\* cited by examiner

*Primary Examiner* — Monica A Huson
(74) *Attorney, Agent, or Firm* — XSENSUS LLP

(57) ABSTRACT

A laser processing method includes: marking multiple concaves on a surface of a preform before blow molding.

13 Claims, 19 Drawing Sheets

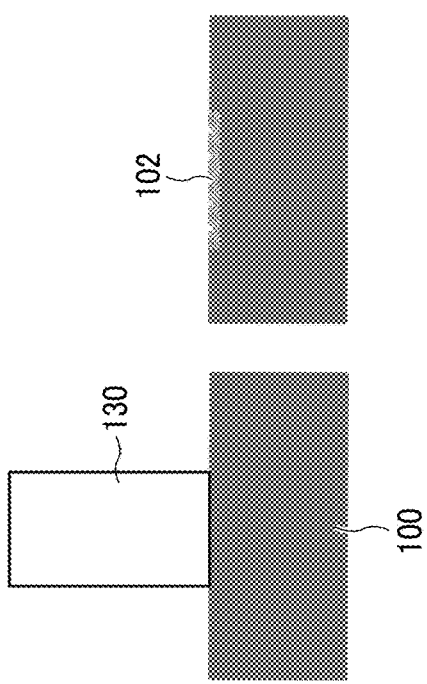

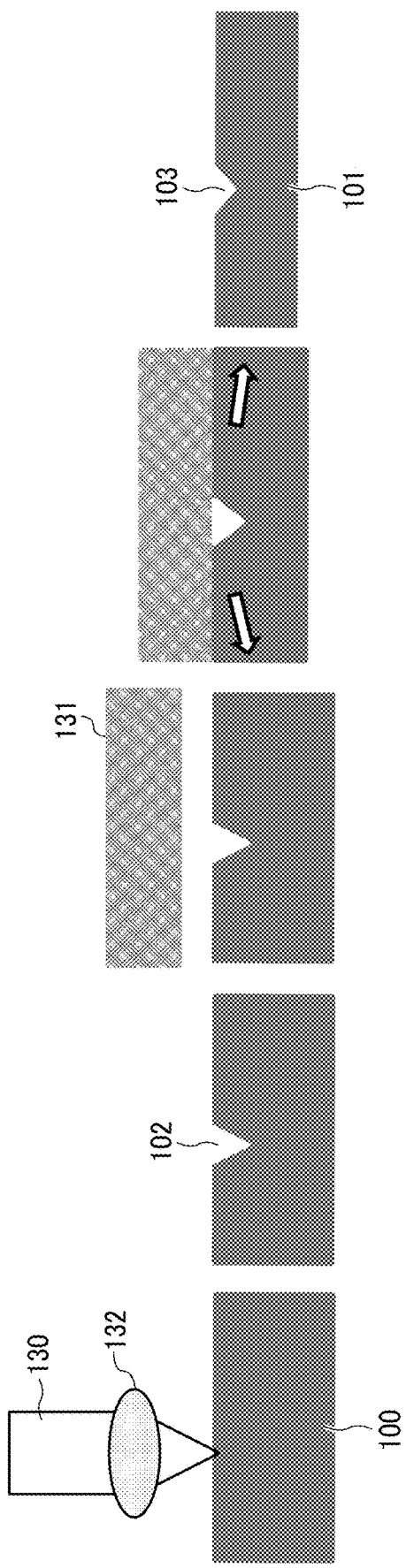

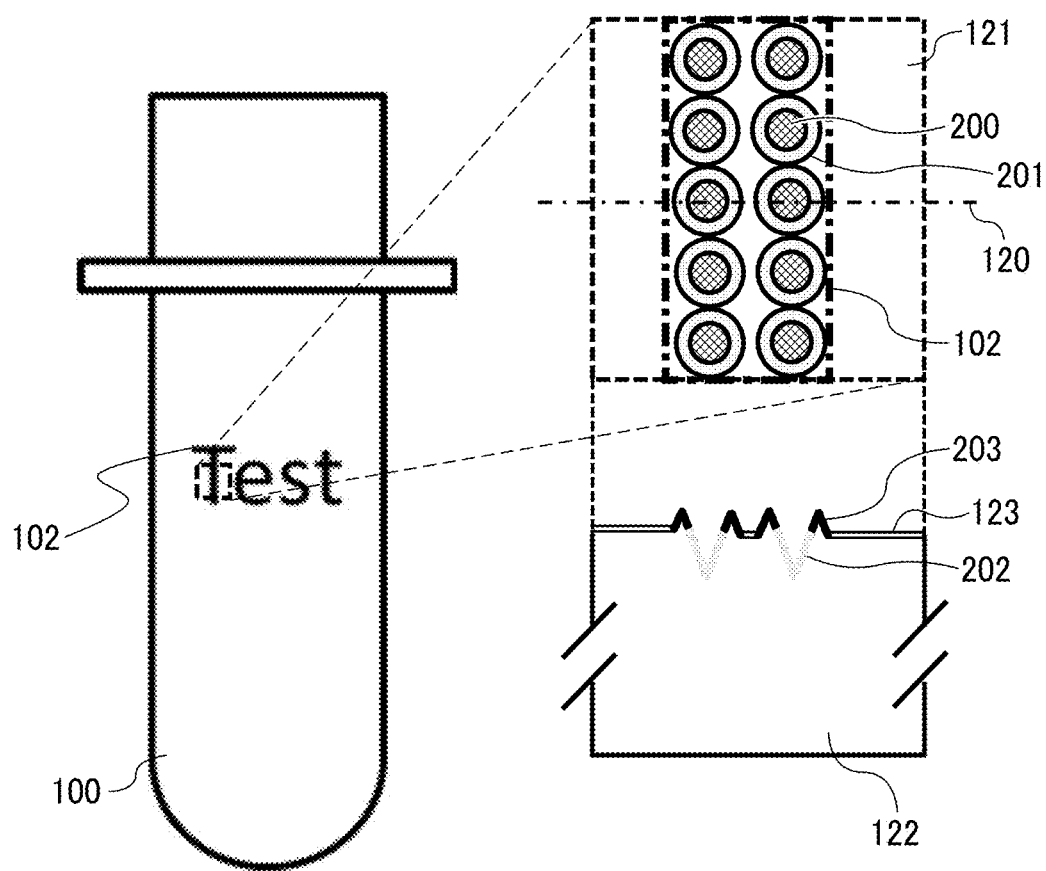

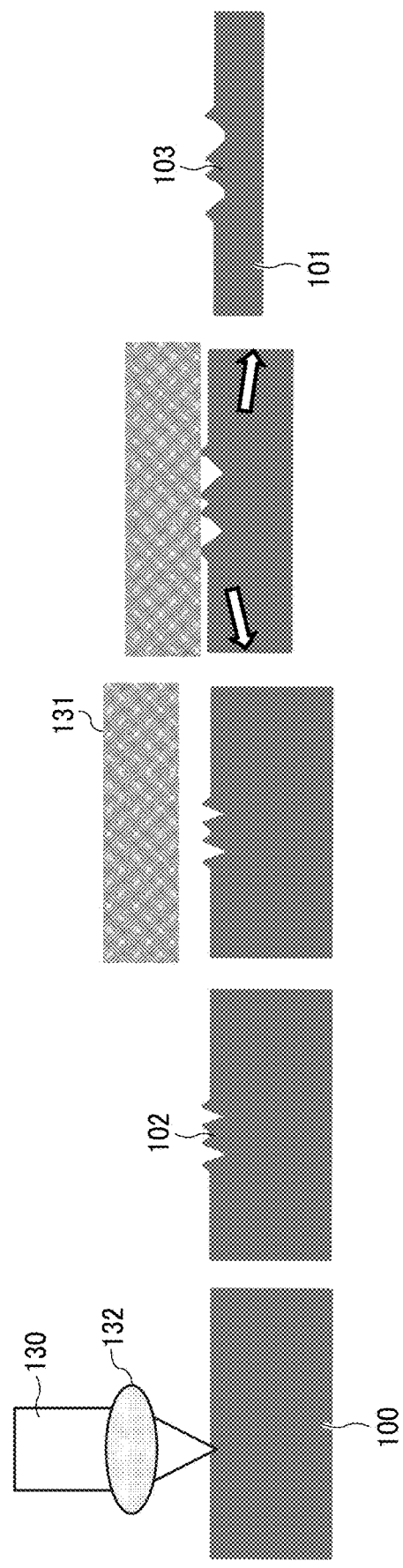

LASER PROCESSING METHOD AND PREFORM

CROSS-REFERENCE TO RELATED APPLICATIONS

This patent application is based on and claims priority pursuant to 35 U.S.C. § 119(a) to Japanese Patent Application No. 2021-209856, filed on Dec. 23, 2021, in the Japan Patent Office, the entire disclosure of which is hereby incorporated by reference herein.

BACKGROUND

Technical Field

The present disclosure relates to a laser processing method and a preform.

Related Art

There is a plastic container mainly made of crystalline resin. The plastic container has different optical properties in different crystal structures of the crystalline resin and produces vivid colors, dark and glossy colors, which are different from chemically produced colors. Such a plastic container has an advantage in recycling.

SUMMARY

An embodiment of the present disclosure provides a laser processing method includes: marking multiple concaves on a surface of a preform before blow molding.

Further, an embodiment of the present disclosure provides a preform having the multiple concaves formed by the laser processing method.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 3A is a diagram of the laser emission process as a comparative example;

FIG. 3B is a diagram of the marking process as the comparative example;

FIG. 3C is a diagram of the heating process as the comparative example;

FIG. 3D is a diagram of the blow molding as the comparative example;

FIG. 3E is a diagram of the molded product as the comparative example;

FIG. 5A is a diagram of the laser emission process in the present embodiment;

FIG. 5B is a diagram of a marking process after the laser emission process in FIG. 5A in the present embodiment;

FIG. 5C is a diagram of the heating process after the marking process in FIG. 5B;

FIG. 5D is a diagram of the blow molding process after the heating process in FIG. 5C;

FIG. 5E is a diagram of the molded product after blow molding process in FIG. 5D;

FIG. 17A is a diagram of an example of the mark formed on the preform according to the seventh modification in the present embodiment;

FIG. 17B is an enlarged and cross-sectional view of the mark on the preform in FIG. 17A according to the seventh modification;

FIG. 19A is a diagram of the laser emission process in the seventh modification;

FIG. 19B is a diagram of the mark after the laser emission process in FIG. 19A in the seventh modification;

FIG. 19C is a diagram of the heating process after the marking process in FIG. 19B in the seventh modification;

FIG. 19D is a diagram of the blow molding process after the heating process in FIG. 19C in the seventh modification;

FIG. 19E is a diagram of the molded product after blow molding process in FIG. 5D in the seventh modification;

Figure 1:
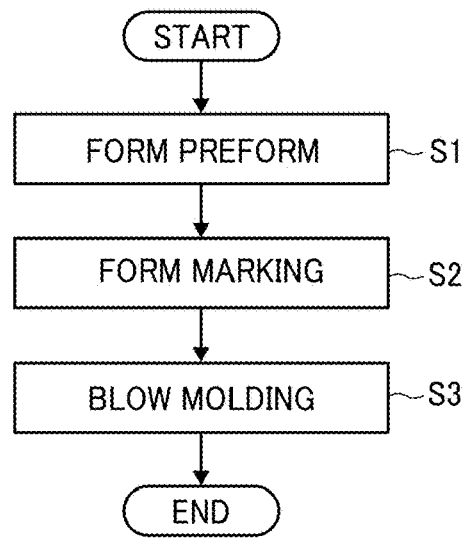
FIG. 1 is a flowchart of a laser processing method according to the present embodiment.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

According to the embodiments of the present invention, the laser processing method to form the mark or to mark the concave on the surface of the preform and the preform that maintains the concave marked on the surface are provided.

Hereinafter, embodiments of the present invention will be described with reference to the drawings. In the description of the drawings, the same components are denoted by the same reference numerals, and overlapping description will be omitted.

Embodiment

FIG. 1 is a flowchart of a laser processing method according to the present embodiment.

In FIG. 1, a preform is formed (S1), a mark is made on the preform by laser processing (S2), and a molded product is formed by blow molding (S3). In the laser processing, laser light (laser beam) is emitted to the preform.

A laser processing method includes: marking multiple concaves on a surface of a preform before blow molding.

A preform has the multiple concaves formed by the laser processing method.

Figure 2A:
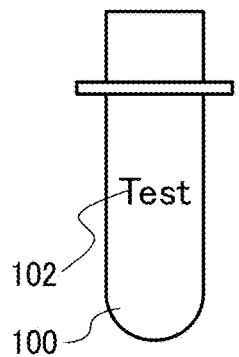
FIG. 2A is a diagram of an example of the preform according to the present embodiment.
Figure 2B:
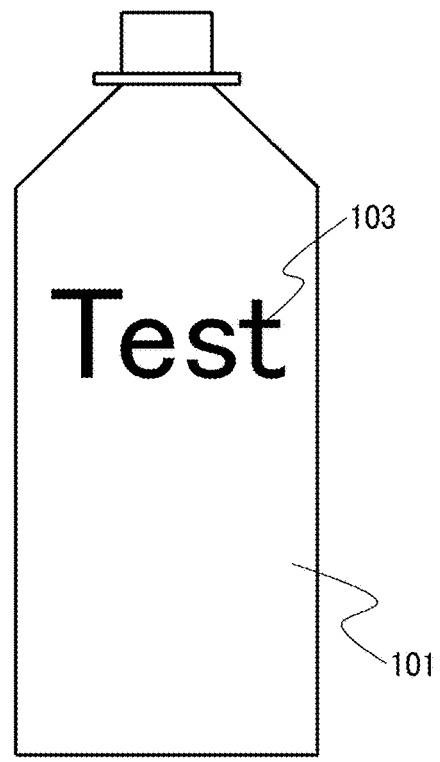
FIG. 2B is a diagram of an example the molded product according to the present embodiment.

FIGS. 2A and 2B are diagrams of a basic configuration according to the present embodiment. FIG. 2A is an example of the preform 100, and FIG. 2B is an example of the molded product 101. Specifically, the preform or the molded product includes a plastic container, a plastic bottle, or a polyethylene terephthalate (PET) bottle.

In the present embodiment, the mark 102 is formed on the preform 100 before blow molding, and the molded product 101 after blow molding still includes the mark 103. In other words, the mark 103 is formed by expanding the mark 102 on the preform 100 in the blow molding.

In the region of the mark 102, the preform (i.e., the material of the preform) is deformed or modified by a reaction such as melting, vaporization, or foaming caused by laser light emission. Such a reaction forms a minute concave and convex on the surface of the preform or a minute foam in the vicinity of the surface of the preform as the mark. The minute concave and convex, or foam increases the scattering coefficient of light and becomes hazy or whitish. Such a phenomenon is equivalent to the microfacet theory in computer graphics. Since the surface of the preform is flat and transparent, the contrast between the preform and the mark that is hazy or whitish is generated, and the mark 102 is visually recognizable.

Since the mark 102 of the preform 100 is smaller than the mark 103 of the molded product 101, the region of the laser processing of the mark 102 is also smaller. If the mark 103 on the molded produce is formed by the laser processing, the productivity of the mark 103 is decreased as compared with that of the mark 102. Thus, the productivity increases.

The mark 102 formed on the preform before blow molding may be visually unrecognizable, but the mark 103 on the molded product 101 after blow molding is visually recognizable.

FIGS. 3A to 3E are diagrams of steps of the laser processing method as a comparative example. FIG. 3A is a diagram of the laser emission process. In the laser emission process, the laser light 130 is emitted to the preform 100. FIG. 3B is a diagram of the mark 102 formed on the surface of the preform 100 by a thermal reaction or a chemical reaction caused by the laser emission. FIG. 3C is a diagram of the heating process. In the heating process, the preform is heated, and the mold 131 for blow molding is arranged in the vicinity of the preform 100. FIG. 3D is a diagram of the blow molding process. In the blow molding process, gas is injected into the preform 100, and the preform expands. The surface of the preform 100 is pressed to the mold 131. When the surface of the preform 100 is pressed to the mold 131, the mark 102 is also pressed to the mold 131, and the shape of the mark 102 is deformed. FIG. 3E is diagram of the molded product 101 having the deformed mark 103 after blow molding. The mark 102 is unintentionally deformed and formed as the deformed mark 103.

Figure 4A:
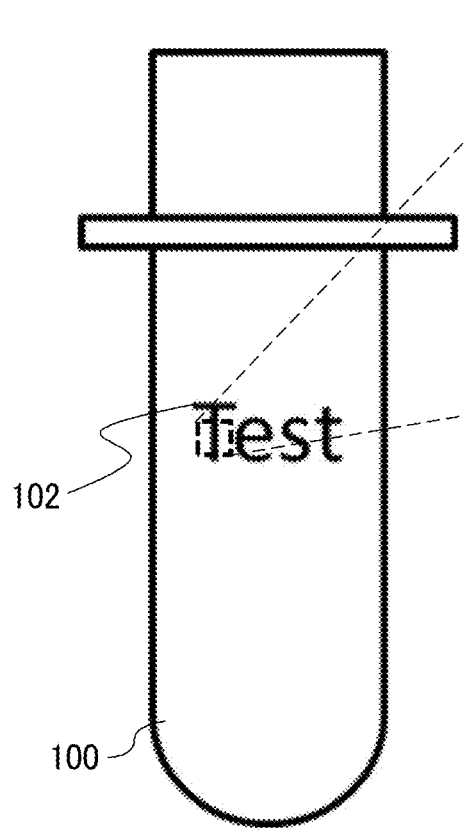
FIG. 4A is a diagram of an example of a mark on the preform in the present embodiment.
Figure 4B:
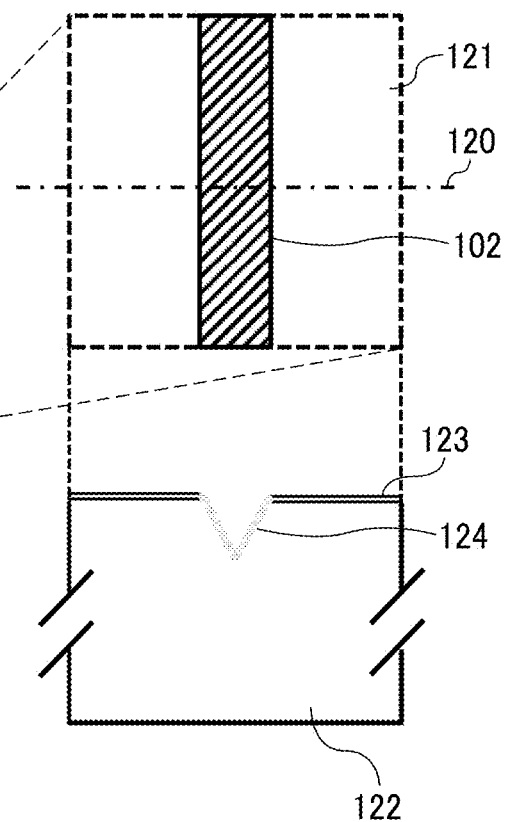
FIG. 4B is an enlarged and cross-sectional view of the mark on the preform in FIG. 4A.

FIG. 4A is a diagram of an example of the mark formed on the preform in the present embodiment. FIG. 4B is an enlarged and cross-sectional view of the mark on the preform in 4A.

As illustrated in FIG. 4A, the mark 102 is formed on the preform 100. In FIG. 4B, an enlarged view 121 and a cross-sectional view 122 by cutting line 120 of the mark 102 on the preform 100 are illustrated. In the cross-sectional view 122 of the preform 100, the mark 102 has a mark surface 124 having a concave shape formed with respect to the preform surface 123 of the preform 100. The marking may have a V-shape surface.

FIGS. 5A to 5E are diagrams of the laser processing method according to the present embodiment. FIG. 5A is a laser emission process. In the laser emission process, the laser light 130 is emitted to the preform 100. The laser light 130 may be condensed by using the condensing lens 132. FIG. 5B is a diagram of a mark 102 formed by the laser processing. The shape of the mark 102 is a concave shape (concave). FIG. 5C is a diagram of the heating process. In the heating process, the preform is heated, and the mold 131 for the blow molding is arranged in the vicinity of the preform 100. FIG. 5D is a diagram of the blow molding process. In the blow molding process, gas is injected into the preform 100, and the preform expands. The surface of the preform 100 is pressed to the mold 131. When the surface of the preform 100 is pressed to the mold 131, the mark 103 is not in contact with the mold 131 because the shape of the mark 102 is concave. FIG. 5E is diagram of the molded product 101 having the mark 103 after blow molding. Since the mark 103 formed on the molded product 101 is not in contact with the mold, the mark 103 maintains its shape and is visually recognizable.

The mark 102 may also be formed by coloring of a thermal reaction or a photochemical reaction in the laser processing (i.e., coloring method), or a chemical reaction of pigment addition (i.e., pigment method). The mark 102 may also be in combination with the coloring method or the pigment method and the laser processing method illustrated in FIGS. 5A to 5E (i.e., combination marking). In the case of the combination marking, preferably, the wavelength of the laser light used for the laser processing is 0.7 μm to 1.1 μm because the pigment can be selectively reacted.

Figure 6:
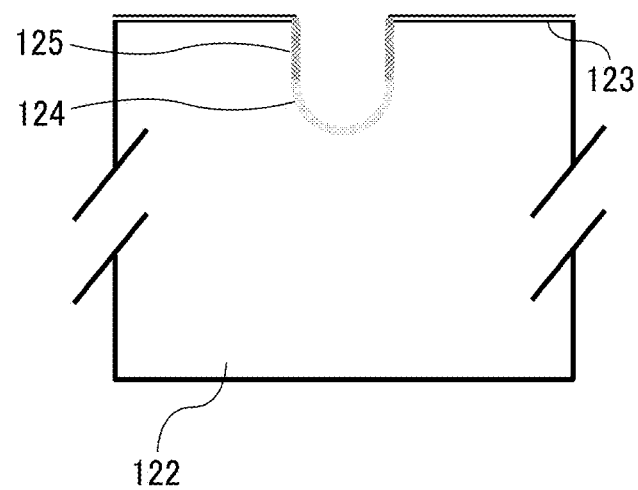
FIG. 6 is a diagram of a mark having a U-shaped cross section made by a marking process according to a first modification of the present embodiment.

FIG. 6 is a diagram of a mark according to the first modification of the present embodiment. In the first modification, the mark has a U-shaped cross section (i.e., U-shaped mark). The U-shaped mark has an inner surface 125 steeper than the mark surface 124 illustrated in FIG. 4.

In the laser processing method, each of the multiple concaves has a U-shaped cross section.

Herein, the U-shaped mark is determined by the angle formed by the preform surface 123 and the inner surface 125. Preferably, the angle is from 45° to 90°, more preferably, from 60° to 90°. Preferably, the U-shaped mark is formed by the top hat laser beam rather than the gaussian beam. The top hat laser beam is formed by adjusting the shape of the laser beam or the scanning condition of the laser beam to widen the angle described above.

Since the shape of the mark is U-shaped, the boundary between the preform surface 123 and the mark surface 124, which are adjacent each other, becomes clear. At the same time, the mark surface 124 is not in contact with the mold 131.

Figure 7C:
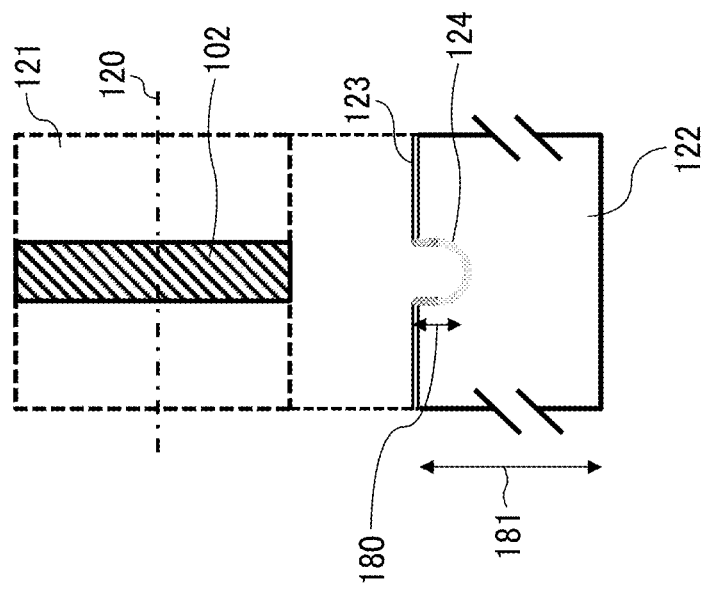
FIG. 7C is an enlarged and cross-sectional view of the U-shaped cross section according to the first modification.
Figure 7B:
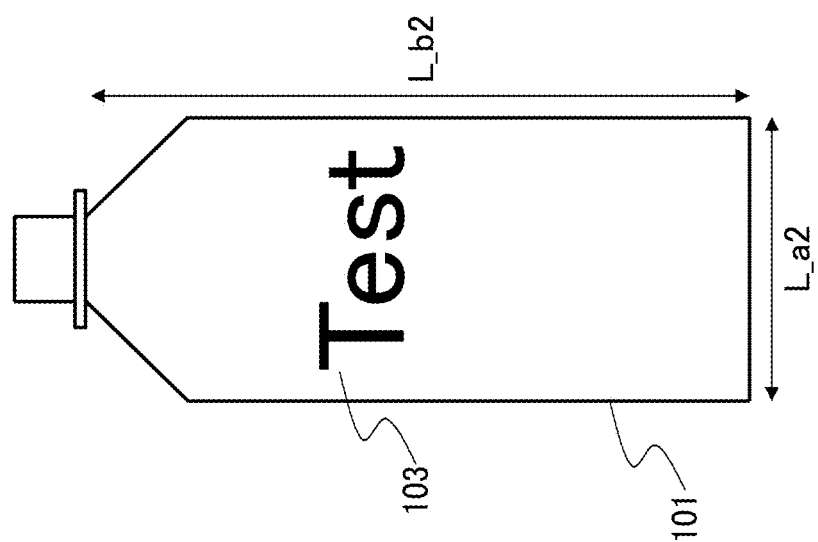
FIG. 7B is a diagram of the molded product according to the first modification.
Figure 7A:
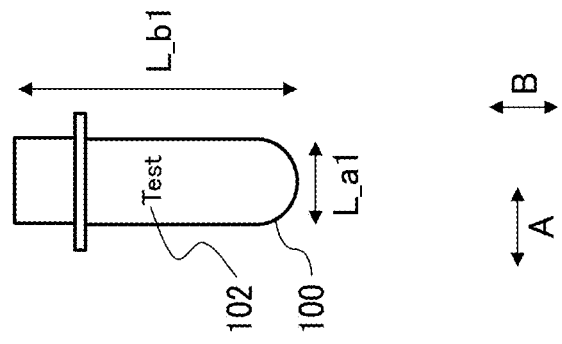
FIG. 7A is a diagram of the preform according to the first modification.

FIGS. 7A to 7C are diagrams of the U-shaped mark as a specific example according to the first modification illustrated in FIG. 6.

A preferable condition for forming the mark will be described with reference to FIGS. 7A to 7C. In the present embodiment, the mark formed on the molded product after blow molding does not affect the mechanical strength and function of the molded product. FIG. 7A is the diagram of the preform 100 having a length L_a1 in a direction A and a length L_b1 in a direction B. The direction A and the direction B are orthogonal each other and denoted by L_a1 and L_b1, respectively. FIG. 7B is a diagram of the molded product 101 having a length L_a2 in the direction A and a length L_b2 in the direction B. The directions A and B, and the lengths L_a2 and L_b2 are similarly to those of the preform. Herein, a value obtained by dividing L_a1 by L_a2, and a value obtained by dividing L_b1 by L_b2 are referred to as enlargement ratios. The enlargement ratio is different between the direction A and the direction B. In other words, the enlargement ratio has anisotropy. The larger value of these two enlargement ratios is defined as the maximum enlargement ratio. In FIG. 7C, an enlarged view and a cross-sectional view by cutting line 120 of the mark 102 on the preform 100 are illustrated. In the cross-sectional view, the mark depth 180 and the preform thickness 181 are denoted.

In the laser processing method, the first direction is orthogonal to the second direction. Herein, for example, the first direction is the direction A, and the second direction is the direction B.

The amount of the mark depth 180 does not exceed the value in which the preform thickness 181 is divided by the maximum enlargement ratio. As a result, even the preform 100 is expanded and the wall surface of the preform 100 is stretched, a hole is not formed in the molded product 101 by the marking.

Figure 8:
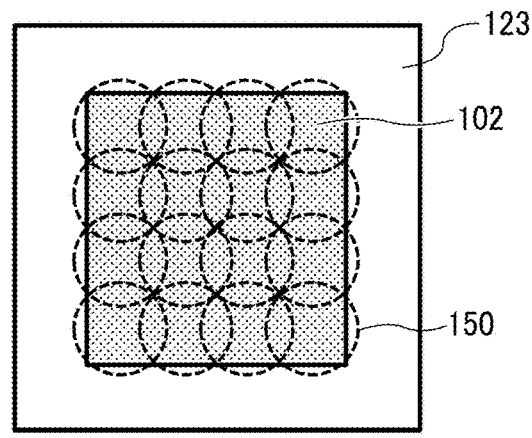
FIG. 8 is a diagram of a mark according to a second modification of the present embodiment.

FIG. 8 is a diagram of a mark according to the second modification of the present embodiment. The mark 102 is formed by multiple minute concaves 150. In the mark 102, the multiple minute concaves 150 are overlapped each other. Herein, the minute concave 150 has the circular shape on the surface of the preform and the concave shape in the cross section. As a result, the entire mark is less likely to be deformed in blow molding.

In the laser processing method, the marking forms at least two concaves of the multiple concaves partially overlapped with each other.

Figure 9:
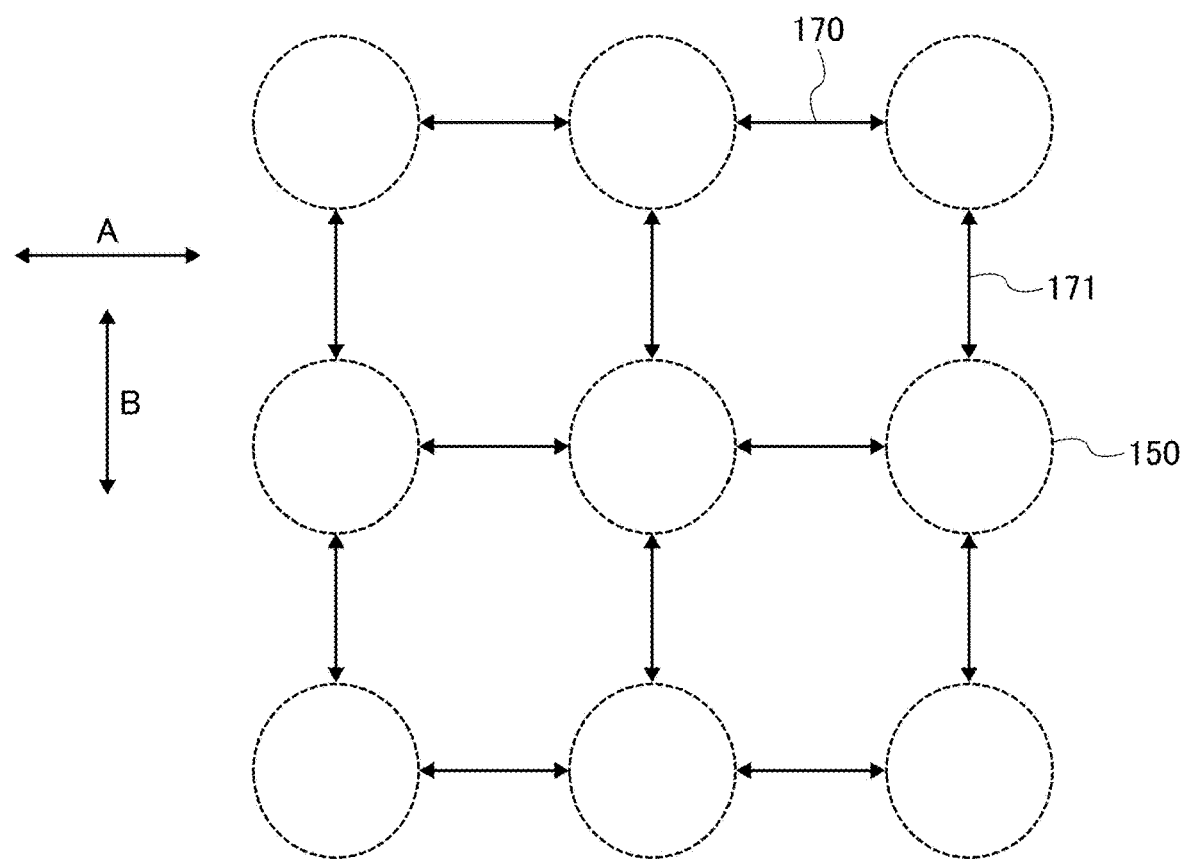
FIG. 9 is a diagram of a concave array having distances A and B between two adjacent concaves according to the present embodiment.

FIG. 9 is a diagram of the mark 102 including multiple minute concaves 150. Herein, the minute concave 150 has a circular shape on the surface of the preform and a concave shape in the cross section. In the mark 102, a distance between two adjacent concaves 150 in the direction A is referred to as a space 170 and a distance between two adjacent concaves 150 in the direction B is referred to as a space 171. The direction A and the direction B is orthogonal to each other. The space 170 and the space 171 are substantially the same.

In the laser processing method, the marking forms at least two concaves of the multiple concaves separated with each other.

Figure 10A:
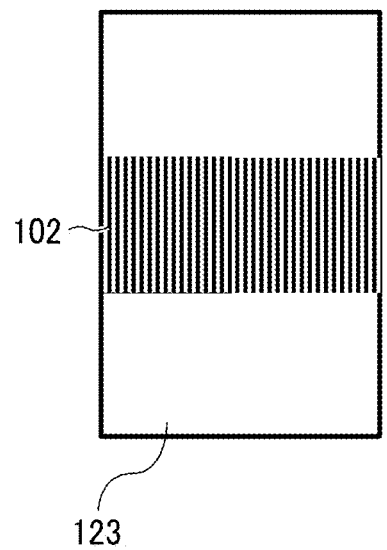
FIG. 10A is a diagram of the mark composed of multiple lines on the preform.
Figure 10B:
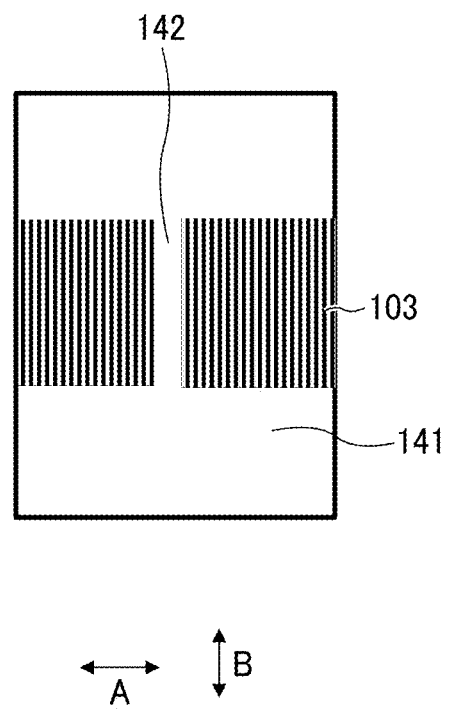
FIG. 10B is a diagram of the mark composed of the multiple lines on the molded product.

FIG. 10A is a diagram the preform surface 123 of the preform having the mark 102 illustrated in FIG. 9 (i.e., before blow molding). FIG. 10B is a diagram of the surface 141 of the molded product expanded by the blow molding (i.e., after blow molding) from the preform in FIG. 10A. The molded product has the mark 103 expanded by the blow molding. The preform and the molded product have multiple line-shaped marks. In the preform, the multiple line-shaped mark are regularly arranged, but there is an irregularity in terms of the space (interval), which is small and is not recognizable. The line-shaped mark including the irregularity are expanded by blow molding, and the irregularity become recognizable in the molded product.

Figure 11:
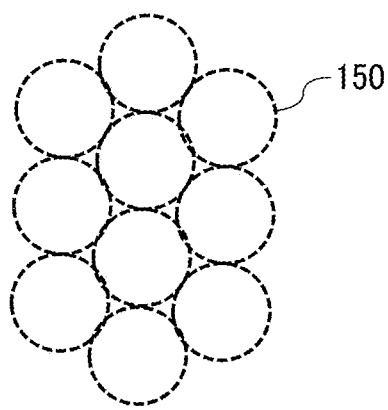
FIG. 11 is a diagram of a mark according to a third modification of the present embodiment.

The irregularity 142 (i.e., wider space) is a portion excluding the concaves and unrecognizable in the preform. But, the irregularity 142 becomes recognizable as a mark deformation in the molded product, FIG. 11 is a diagram of the mark according to the third modification. In FIG. 11, since two concaves formed among multiple concaves 150 are formed adjacent to each other, there is no unprocessed region, which is flat (flat region), between the concaves. Herein, unprocessed region is a cause of irregularity. Accordingly, when the preform is expanded by blow molding, the irregularity of the mark is less likely to generate. Herein, the concave 150 has a circular shape on the surface of the preform and a concave shape in the cross section. The processed region and the unprocessed region will be described in detail below.

In a case where the concaves are adjacent, and the expansion ratio of the preform in blow molding is larger, only the concave is expanded, and the unprocessed portion (i.e., the flat region) is not generated. By contrast, in a case where there is a unprocessed region between concaves, the flat region between the concaves, which is transparent of darker, is expanded. When the flat region is present in the mark whitened and is visually recognized, the flat region stands out and is a cause of "mark deformation". Since the concaves are adjacent to each other, the mark uniformly whitened without the flat region is formed. Herein, the concaves may contact or overlap each other.

In FIG. 11, the concave is further adjacent to other concaves in multiple directions. Since the concave is adjacent to the other concaves in at least two directions, the mark deformation is not generated in the two expanded directions. The expanded direction by blow molding typically has anisotropy. In a case where the concave is adjacent to the other concaves only in one direction, a slit-like flat region is generated in a direction perpendicular to the one direction. Preferably, the concave is adjacent to other concaves in at least two directions substantially perpendicular to each other to prevent the mark deformation. Accordingly, if the preform is anisotropically expanded by blow molding, the mark is not deformed.

In FIG. 11, one concave is adjacent to all concaves around the one concave. As a result, if the preform is expanded in any directions, the mark is not deformed.

In the laser processing method, the marking forms one concave of the multiple concaves adjacent to other of the multiple concaves surrounding the one concave.

When the flat region (i.e., the unprocessed region) has a width of 0.2 mm or more, the flat region becomes visually recognizable as the mark deformation. Preferably, the distance between the concaves on the preform before expanding by blow molding is determined by inversely calculating the expansion ratio.

In the laser processing method, the marking continuously forms at least two concaves of the multiple concaves, and an unprocessed region between said two concaves is 0.2 mm or less on the preform before blow molding.

Figure 12:
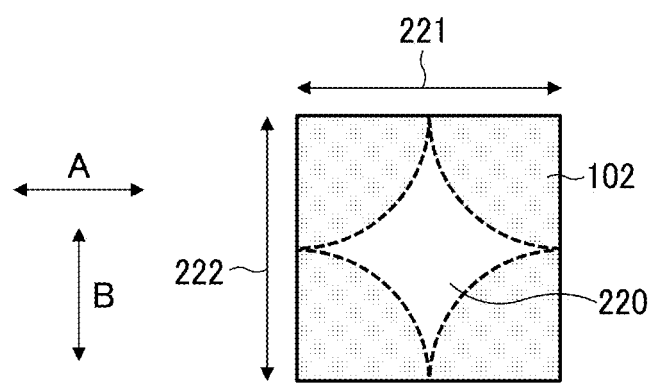
FIG. 12 is a diagram of a portion of the mark having processed portions and a non-processed portion according to the third modification of the present embodiment.

FIG. 12 is a diagram of the mark 102 having the processed region and the unprocessed region 220. The unprocessed region 220 has a width 221 (Lcw) in the direction A and a width 222 (Lch) in the direction B. Preferably, conditional expressions (1) and (2) below are satisfied:

$$\text{Lcw (mm)} \leq 0.2 \text{ (mm)}/Am, \quad (1)$$

$$\text{Lch (mm)} \leq 0.2 \text{ (mm)}/Bm, \quad (2)$$

where Am and Bm are the expansion ratios in the directions A and B, respectively, in the blow-molding process. As a result, the visibility of the mark satisfying the conditional expressions (1) and (2) is improved.

FIGS. 13A to 13D are diagrams of the preform, the molded product, and the marks according to the fourth modification. In the fourth modification illustrated in FIG. 13, the visibility is further improved as compared with the mark 102 illustrated in FIG. 9.

Specifically, in FIG. 9, there are unprocessed regions between the concaves. Since the unprocessed regions are not processed in the laser processing process, the operation rate and the cost for processing are reduced. However, depending on the arrangement of the unprocessed region, the visibility of the mark is reduced. In particular, the mark nonunifomily whitened affects the sensory evaluation.

Figure 13D:
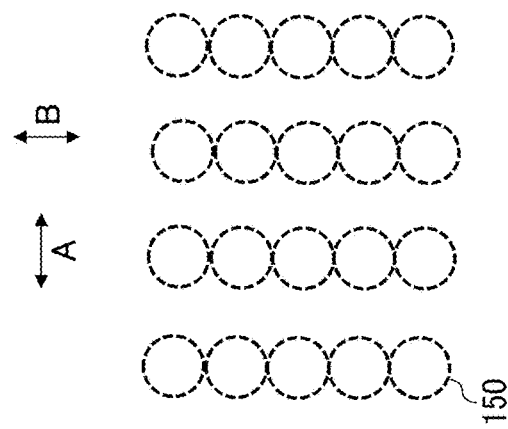
FIG. 13D is a diagram of another mark including the concaves arrayed according to the fourth modification.
Figure 13C:
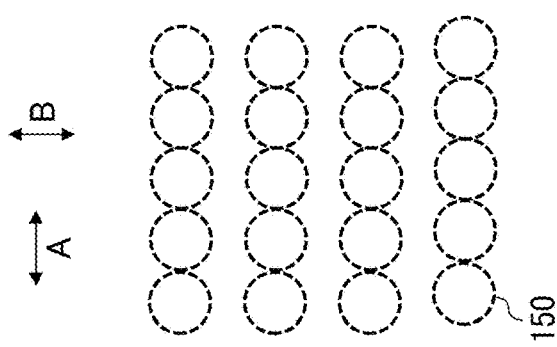
FIG. 13C is a diagram of a mark including the concaves arrayed according to the fourth modification.
Figure 13B:
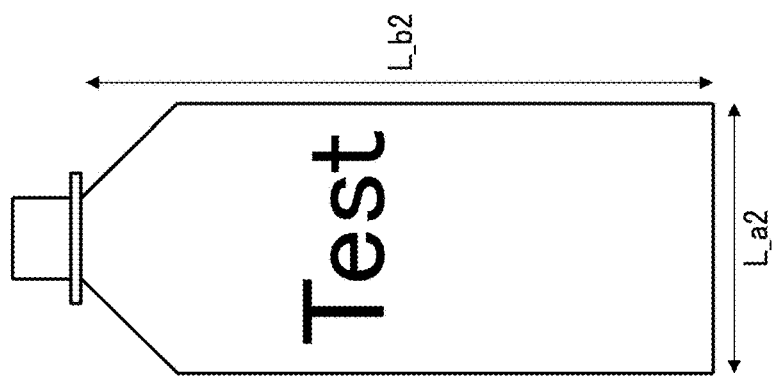
FIG. 13B is a diagram of the molded product according to the fourth modification.
Figure 13A:
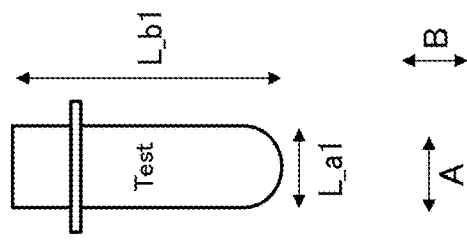
FIG. 13A is a diagram of the preform according to a fourth modification of the present embodiment.

The preform 100 illustrated in FIG. 13A has a length L_a1 in the direction A and a length L_b1 in the direction B. The direction A and the direction B are orthogonal each other. The opening of the preform 100 is parallel to the direction A. The preform (i.e., its size) is expanded by blow molding. FIG. 13B is a diagram of the molded product having a length L_a2 in the direction A and a length L_b2 in the direction B, in which the directions A and B are the same with the directions for the preform in FIG. 13A. Herein, a value obtained by dividing L_a1 by L_a2 and a value obtained by dividing L_b1 by L_b2 are expansion ratios. The expansion ratios are different in the direction A and the direction B. In other words, the expansion ratio is anisotropic. FIG. 13C is the diagram of a mark including the concaves 150 arrayed on the preform 100. The space between the two concaves in the direction A is smaller than that between the two concaves in the direction B. FIG. 13D is the diagram of another mark including the concaves 150 marked on the preform 100. The space between the two concaves in the direction B is smaller than that between the two concaves in the direction A.

In the laser processing method, the marking forms one concave of the multiple concaves adjacent to other of the multiple concaves in multiple directions.

In the preform 100 according to the present modification, a first center-to-center distance between two concaves 150 in a first direction having a first expansion ratio of the preform is narrower than a second center-to-center distance between two concaves 150 in a second direction having a second expansion ratio of the preform. The first expansion ratio is higher than the second expansion ratio. As a result, in the molded product 101 after blow molding, the first center-to-center distance and the second center-to-center distance are the same. Thus, the mark uniformly whitened is formed. Thus, the visibility of the mark is improved.

In the laser processing method, the marking continuously forms at least two concaves, and a first center-to-center distance between the two concaves in a first direction having a first expansion ratio of the preform is narrower than a second center-to-center distance between the two concaves in a second direction having a second expansion ratio of the preform. The first expansion ratio is higher than the second expansion ratio. The first expansion ratio and the second expansion ratio are determined by expanding the preform by blow molding.

Since increasing the density of the concave on the preform increases energy of laser emission, the direction in which the density of the concave array is higher is selected depending on the forming condition. Accordingly, the information is added to the molded product with decreasing the workload on the laser processing apparatus.

Figure 14:
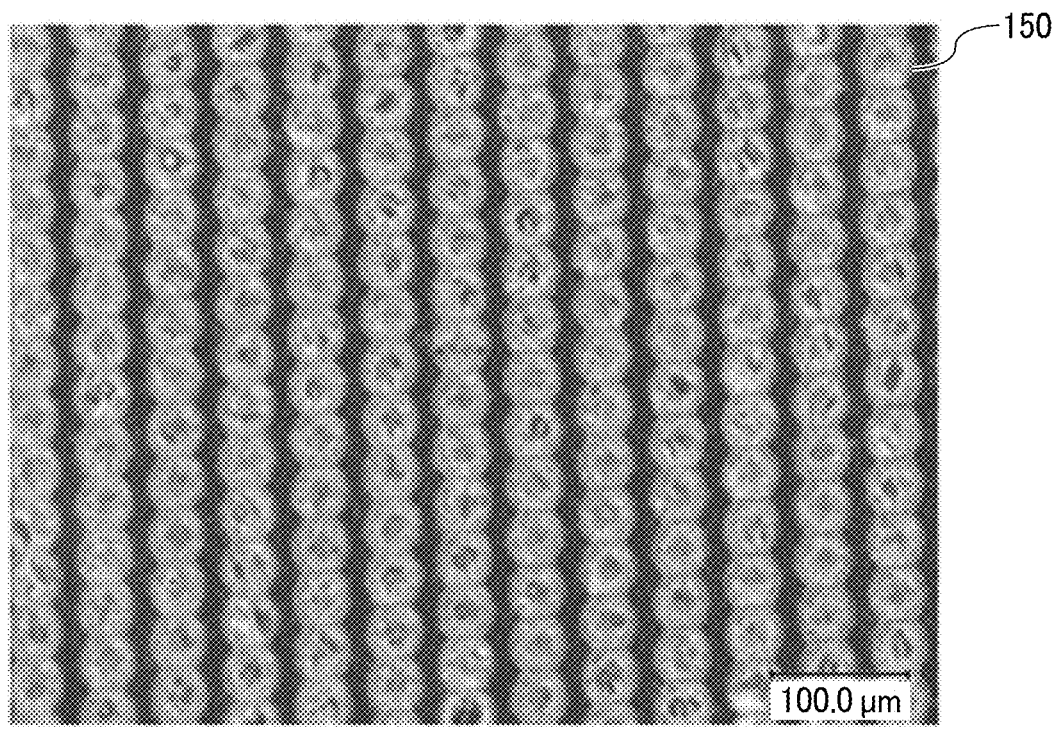
FIG. 14 is a microscopic photograph of the array-like mark according to the fourth modification of the present embodiment.

FIG. 14 is a micrograph of the concave array of the fourth modification.

Since the mark (the concave array) of the present embodiment is formed by laser emission, the mark is formed by appropriately scanning the surface of the preform with the laser light. In the forming the concave array, the laser light may be pulsed light or continuous light, and is not limited thereto. The mark may be formed by single laser light or multiple laser light.

In FIG. 14, the shape of the concave on the surface of the preform is circular, but is not limited thereto. For example, the shape of the concave on the surface of the preform may be elliptic, linear, or rectangular. These shapes are formed by changing the scanning method of laser light.

Figure 15A:
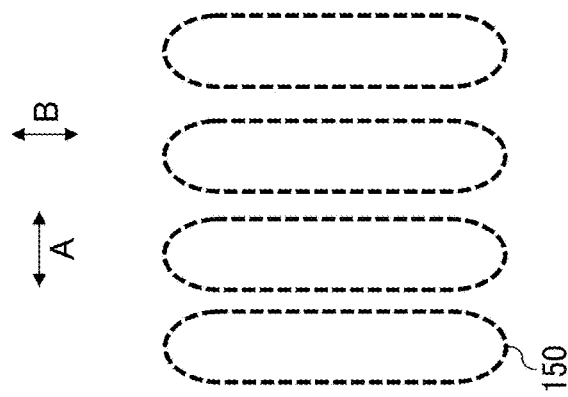
FIG. 15A is a diagram of the preform according to the fifth modification of the present embodiment.
Figure 15B:
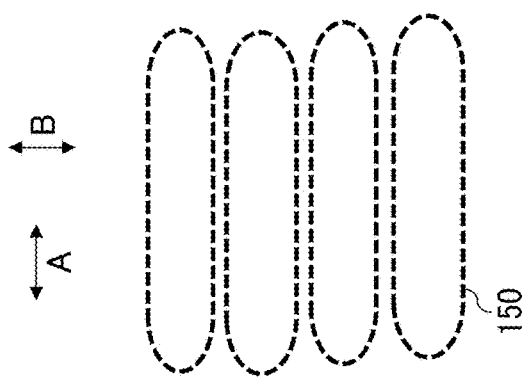
FIG. 15B is a diagram of the molded product according to the fifth modification.
Figure 15C:
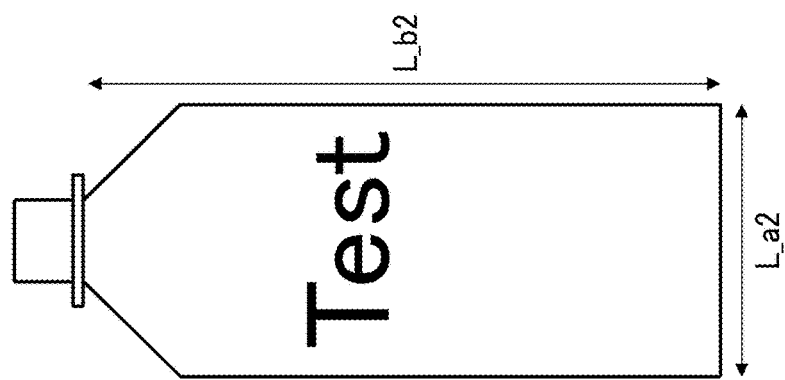
FIG. 15C is a diagram of an elliptical mark according to the fifth modification.
Figure 15D:
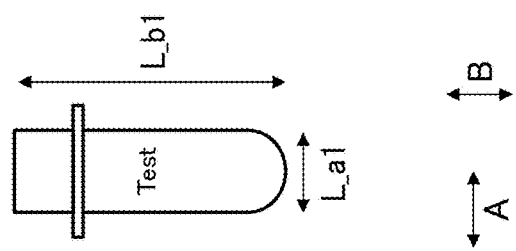
FIG. 15D is a diagram of the mark of another elliptical mark according to the fifth modification of the present embodiment.

FIGS. 15A to 15D are diagrams of the preform, the molded product, and the marks according to the fourth modification. FIG. 15A is a diagram of the preform 100. The preform 100 illustrated in FIG. 15A has a length L_a1 in the direction A and a length L_b1 in the direction B. The direction A and the direction B are orthogonal each other. The opening of the preform 100 is parallel to the direction A. The preform (i.e., its size) is expanded by blow molding. FIG. 15B is a diagram of the molded product having a length L_a2 in the direction A and a length L_b2 in the direction B, in which the directions A and B are the same with the directions for the preform in FIG. 15A. Herein, a value obtained by dividing L_a1 by L_a2 and a value obtained by dividing L_b1 by L_b2 are expansion ratios. The expansion ratios are different in the direction A and the direction B. In other words, the expansion ratio is anisotropic. FIG. 15C is a diagram of the mark including rows of the concave on the surface of the preform 100. The shape of the concave on surface of the preform 100 is an elliptical shape elongated in the direction A. FIG. 15D is a diagram of mark including columns of the concave on the surface of the preforms 100. The shape of the concave on the surface of the preform 100 is an elliptical shape elongated in the direction B.

In the preform of the present modification, the concave is formed in an elliptical shape so that the length of the concave in the direction in which the expansion ratio is larger is longer than the length of the concave in the direction in which the expansion ratio is smaller when the preform is expanded to the molded product. Effects similar to those of the fourth modification is obtained.

Figures 16A, 16B:
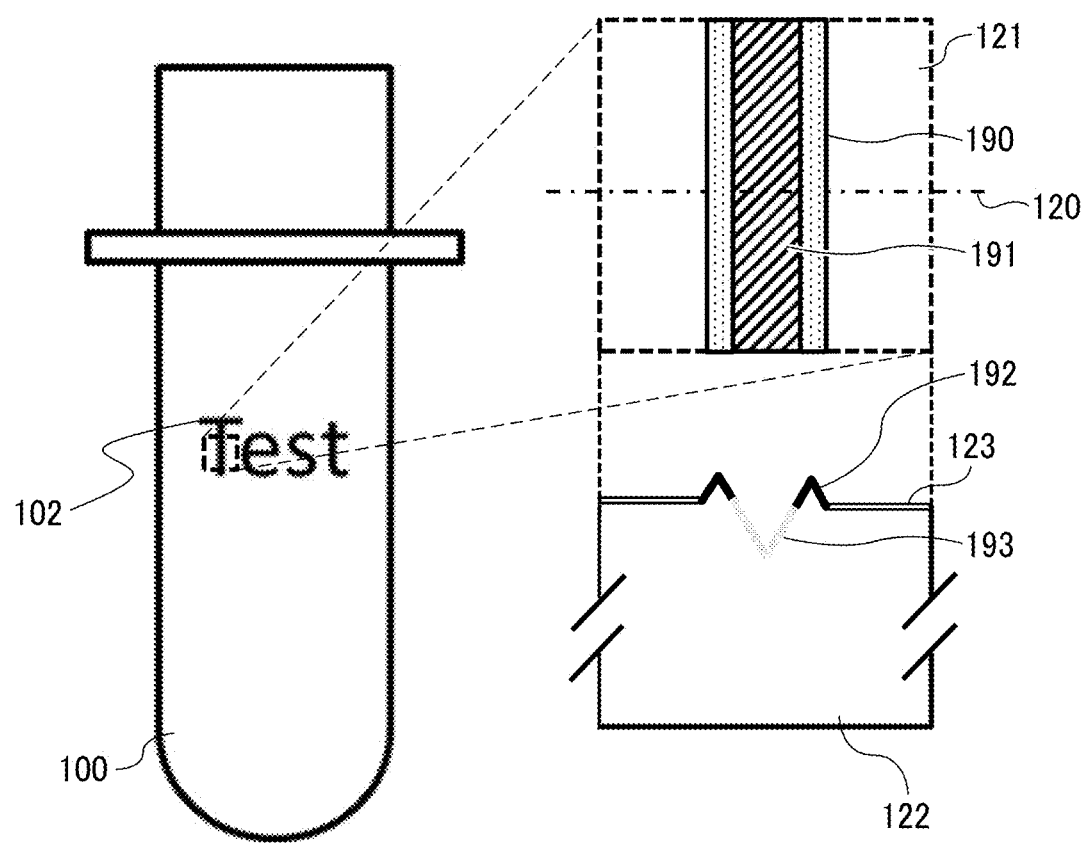
FIG. 16A is a diagram of an example of the mark formed on the preform according to the sixth modification in the present embodiment.
FIG. 16B is an enlarged and cross-sectional view of the mark on the preform in FIG. 16A according to the sixth modification.

FIGS. 16A and 16B are diagrams of the mark formed on the preform 100 according to the sixth modification. FIG. 16A is a diagram of the preform 100 according to the sixth modification. In FIG. 16B, an enlarged view 121 and a cross-sectional view 122 by cutting line 120 of the mark 102 on the preform 100 are illustrated. In FIG. 16A, a convex-adjacent-concave 191 and a convex 190 of the mark are illustrated. In the cross-sectional view, the concave surface 193 and the convex surface 192 are illustrated.

In the present embodiment, the convex 190 are provided on the surface of the preform adjacent to the convex-adjacent-concave 191. By providing the convex, the concave is harder to contact with the mold at the time of blow molding. The material of the preform is melted by the laser emission (i.e., melted material), and the convex 190 is formed by deposition of the melted material on the wall of the preform adjacent to the convex-adjacent-concave 191. Herein, the melted material is flowed by, for example, Marangoni convection. Accordingly, since the surface of the convex 190 formed by cooling the melted material is smooth, the diffusive reflectance of the convex 190 is lower than that of the convex-adjacent-concave 191. If the convex 190 comes into contact with the mold at the time of blow molding and expands in the in-plane direction of the preform, it is not confused with a mark error.

FIGS. 17A and 17B are diagrams of the preform according to the seventh modification. FIG. 17A is a diagram of a preform 100 according to the seventh modification. In FIG. 17B, an enlarged view 121 and a cross-sectional view 122 taken by culling line 120 of the mark 102 on the preform 100 are illustrated. In the mark 102, multiple circular-concaves 200 and multiple circular-convexes 201 are arranged, and each of multiple circular-convexes 201 is formed around the corresponding multiple circular-concaves 200. In the cross-sectional view 122, the concave surface 202 and the convex surface 203 are illustrated.

In the laser processing method, the marking forms a convex in a periphery of each of the multiple concaves.

Figure 18A:
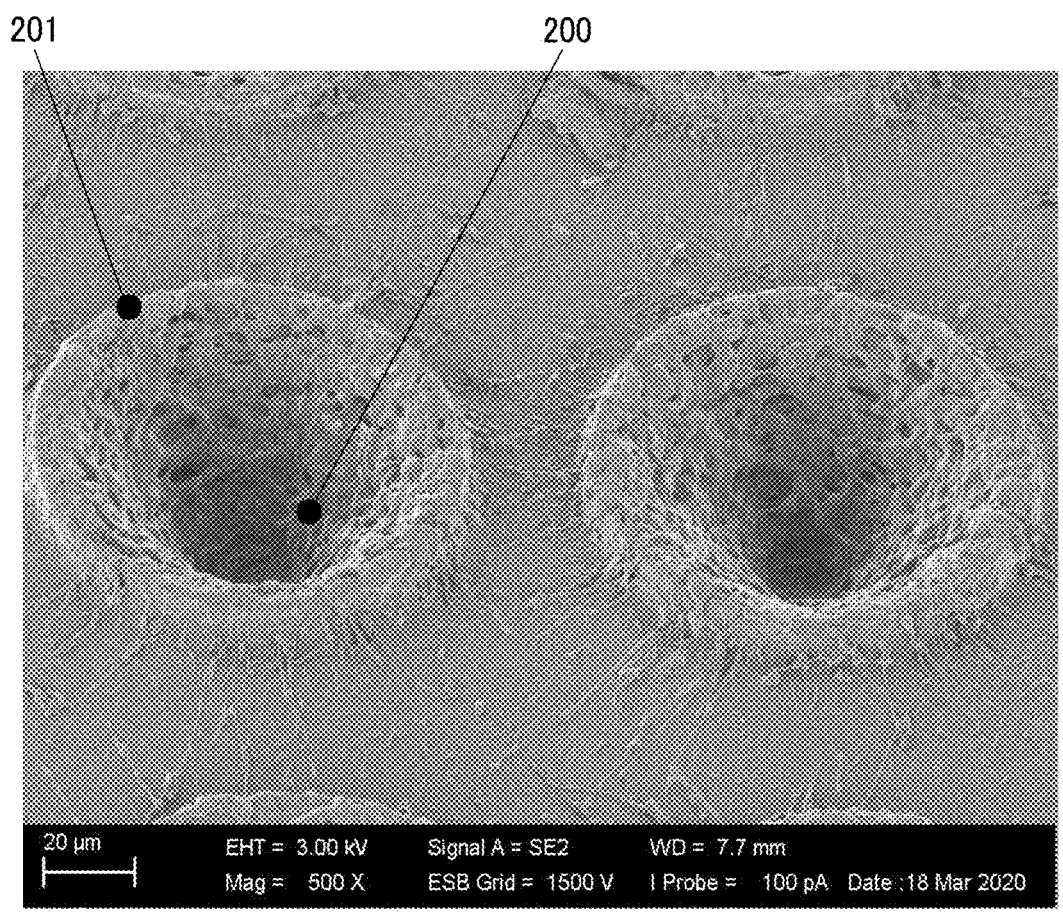
FIG. 18A is a perspective view of an electron micrograph of the mark according to a seventh modification.
Figure 18B:
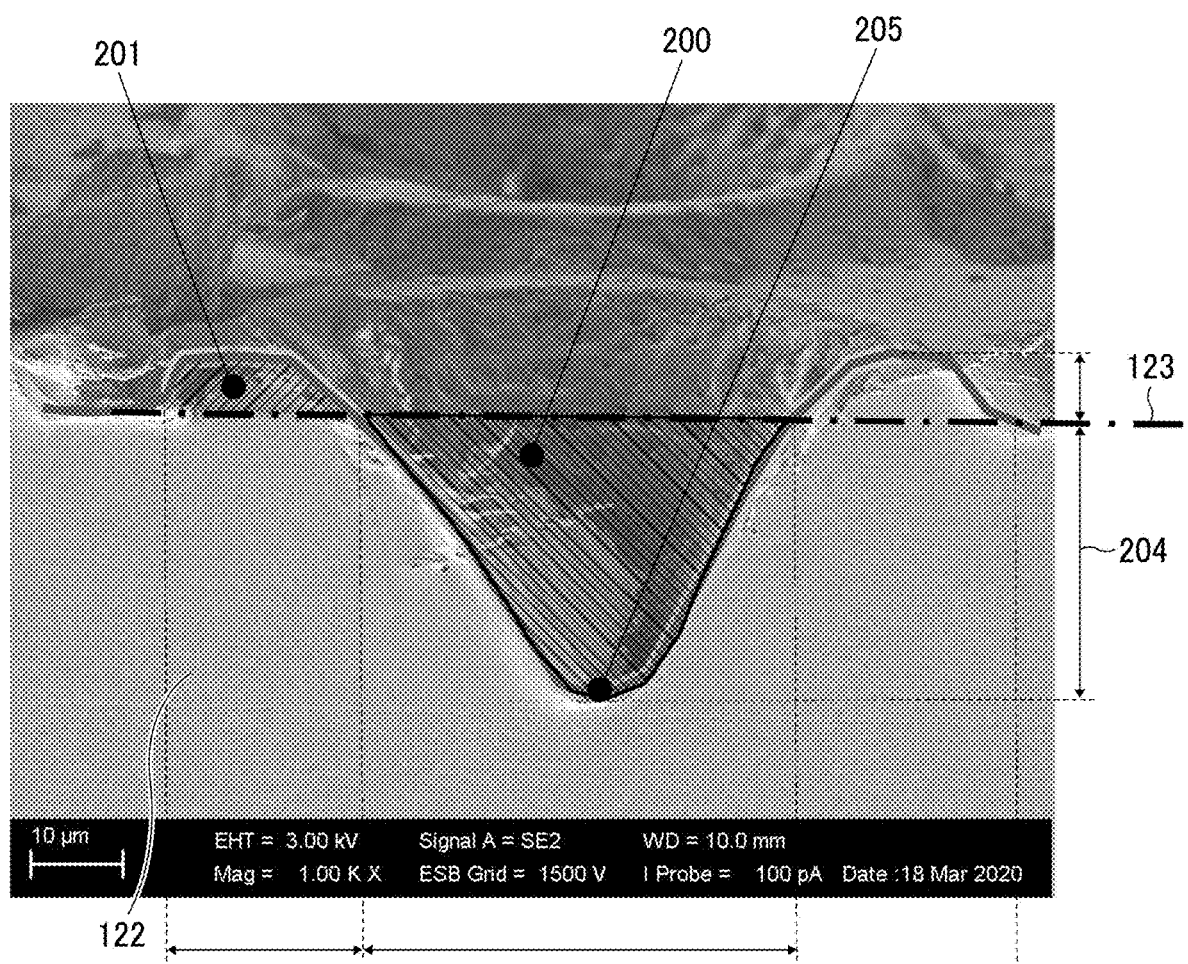
FIG. 18B is a cross-sectional view of an electron micrograph of the mark according to the seventh modification.

FIG. 18A is a perspective view of an electron micrograph of the mark according to a seventh modification. FIG. 18B is a cross-sectional view of an electron micrograph of the mark according to the seventh modification. The circular-convex 201 is formed around the circular-concave 200. The cross-sectional view in FIG. 18B, the concave depth 204 is represented as a distance from the bottom 205 of the concave to the preform surface 123.

FIGS. 19A to 19F are diagrams of a laser processing method according to the seventh modification. FIG. 19A is a laser emission process. In the laser emission process, the laser light 130 is emitted to the preform 100. The laser light 130 may be condensed by using the condensing lens 132. FIG. 19B is a diagram of a mark 102 formed by the laser processing. The shape of the mark 102 is the concave shape and the convex shape. FIG. 19C is a diagram of the heating process. In the heating process, the preform is heated, and the mold 131 is arranged in the vicinity of the preform 100 for the blow molding. FIG. 19D is a diagram of the blow molding process. In the blow molding process, gas is injected into the preform 100, and the preform expands. The surface of the preform 100 is pressed to the mold 131. When the surface of the preform 100 is pressed to the mold 131, the mark 103 is not in contact with the mold 131 because the shape of the mark 102 is concave. Further, the concave is less likely to come into contact with the mold because there is convex around the concave. FIG. 19E is a molded product 101 after blow molding. Since the mark 102 formed on the molded product 101 is not in contact with the mold, the mark 102 maintaining the shape of the concave is visually recognized.

Figure 20:
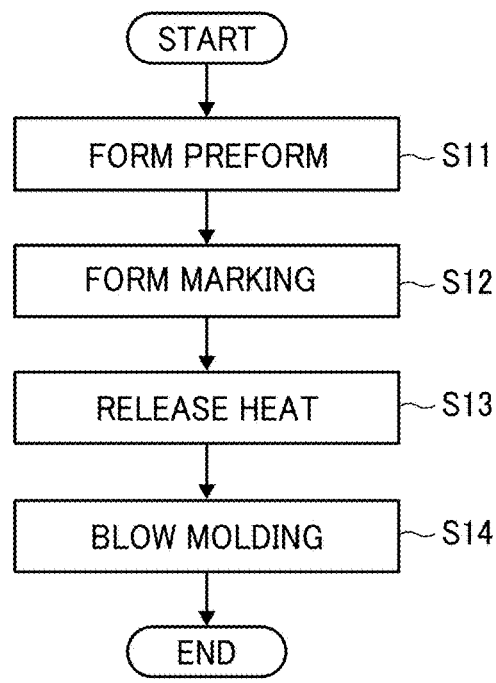
FIG. 20 is a flowchart of a laser processing method according to an eighth modification of the present embodiment.

FIG. 20 is a flowchart of a laser processing method according to an eighth modification. In the laser emission to the preform, since a region of the preform emitted by the laser is locally heated according to the amount of the laser emission, the temperature distribution of the region on the preform during blow molding becomes non-uniform, the expansion ratio also becomes non-uniform, and unintended molding occurs. As illustrated in FIG. 20, in order to uniformize the temperature distribution of the preform during blow molding, it is preferable that the preform is cooled to a temperature at which the glass transition point of the preform material is lowest by heat dissipation after laser emission. The laser processing method according to the present modification is substantially equivalent to a process using a cold parison, which is considered to be compatible with the present embodiment.

Figure 21:
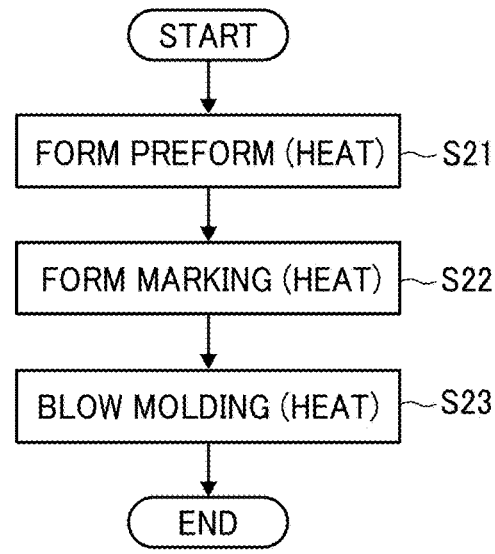
FIG. 21 is a flowchart of a laser processing method according to a ninth modification of the present embodiment.

FIG. 21 is a flowchart of a laser processing method according to the ninth modification. In the ninth modification, the preform is expanded to the molded product without cooling and solidifying while maintaining the temperature molding the preform. Accordingly, thermal energy in the processing is less likely to waste. Preferably, the conditions of the laser emission in the ninth modification is optimized to reduce the influence of the temperature change caused by the laser emission. Specifically, a pulse laser having a picosecond-order pulse that has less thermal influence in laser processing is used. Preferably, the condition of the pulse laser is of a pulse of 100 picoseconds or shorter.

Figure 22:
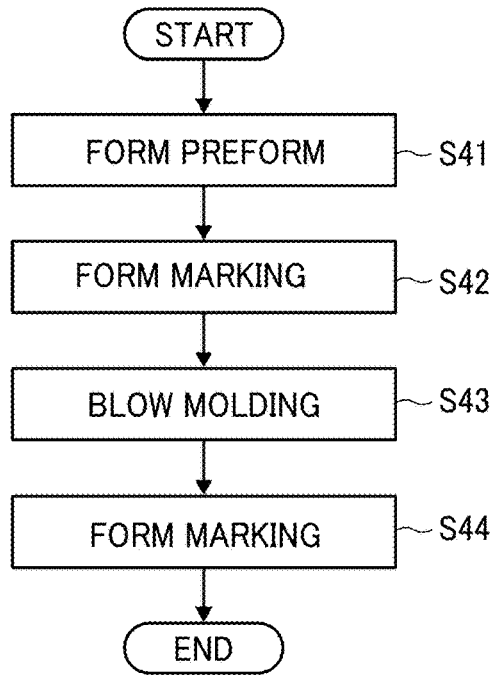
FIG. 22 is a flowchart of a laser processing method according to a tenth modification of the present embodiment.

FIG. 22 is a flowchart of a laser processing method according to the tenth modification. The preform is expanded to the molded product by blow molding. The mark formed on the preform is expanded proportional to the expansion ratio, and the area of the mark on the molded product becomes larger. When the mark to be formed, for example, a log of a brand, has a larger area, the mark is formed on the preform before blow molding (S41). When the mark to be formed, for example, ingredients, has a smaller area, the mark is formed on molded product after blow molding (S44).

In the laser processing method further includes: marking multiple concaved on the surface of the preform after the blow molding.

As described above, since the mark having a large area is formed in the preform before blow molding (S42), the mark is formed at a higher speed as compared with a case where the mark is formed on the molded product after the blow molding. By contrast, since the smaller mark is formed on the molded product after blow molding (S44), the mark is formed more finely than when the mark is formed on the preform before blow molding. The laser processing is performed on the preform and the molded product in two separate steps. Thus, the laser processing at both higher precision and higher speed is achieved. In addition, if the laser processing is performed after blow molding, the amount of fine information is smaller. Thus, the workload is not increased.

Preferably, a finer mark is formed on the preform. A laser light having a shorter wavelength has an advantage in forming a smaller focus due to the diffraction limit. Preferably, UV laser light is used as the laser light. Furthermore, when the wavelength is 0.2 µm to 0.4 µm, it is preferable for forming a finer mark, and such a wavelength is absorbable in many resin materials. Thus, the base material is easy to modify.

Figure 23:
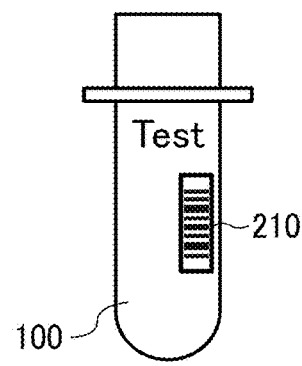
FIG. 23 is a diagram of a mark formed on the preform according to the present embodiment.

FIG. 23 is a preform having a mark of the bar code according to the present embodiment. A bar code includes indispensable information adding to the label-less product and is effective to spread to other than e-commerce. For example, in a case of a Japanese Article Number (JAN) code, the size of a module which is a minimum unit constituting a bar code is about 0.33 mm per module (i.e., mm/module) as a standard size. Since the mark formed on the preform is a reduced scale (larger size is preferable), and it is 0.66 mm/module in consideration of the maximum allowable expansion ratio of 2.0 of the JAN code.

In the beverage industry, label-free bottles are spreading to use. For example, the size of the cap attachment portion of a plastic bottle of 500 ml is about 24 mm in diameter, which may be equivalent to the diameter of the preform, and the diameter of the molded product is from 60 mm to 70 mm. Thus, the expansion ratio is from 2.5 to 2.9.

In consideration of the expansion ratio, the mark is reduced to be formed on the preform. When the expansion ratio is 2.5 and the size of the module is 0.66 mm, one module to be formed on the preform is 0.264 mm (264 µm) or less. The beam size of the laser light is also 264 µm or less. Preferably, the printing amount is smaller. In consideration of the JAN code allowable minimum magnification of 80%, the size of the JAN code is 105 µm. Preferably, the laser emission region is also 105 µm or less.

When the mark is formed by arranging multiple minute concaves by forming the pulse laser, preferably, the area of the laser processing is smaller as long as there is no reading error on the code. In a case where multiple columns including circular concaves is formed to align, the width of the one module is, for example, 52.5 µm for two columns, 35 µm for three columns, 26.25 µm for four columns, and 21 µm for five columns.

In the present embodiment, the beam diameter of the laser light is 1 µm to 132 µm. When the size of preform is 24 mm in diameter (the cap size is 28 mm in common), and the size of PET bottle (i.e., the molded product) is from 60 mm to 70 mm in diameter, the enlargement ratio is from 2.5 to 2.8.

When the JAN code is written as the original size (i.e., 100%), the module-width is 0.33 mm. Thus, the size of the single module formed on the preform is 132 µm (i.e., 0.33/2.5=132 µm) in width.

By setting the beam width of the laser light to 132 µm or less, a barcode is easy to form on the preform as a versatile manner. In addition, when the beam diameter is 1 µm or more, the beam is focused with a simple lens configuration without exceeding the diffraction limit, and a long working distance is obtained, so that the manufacturing cost is reduced.

Figure 24:
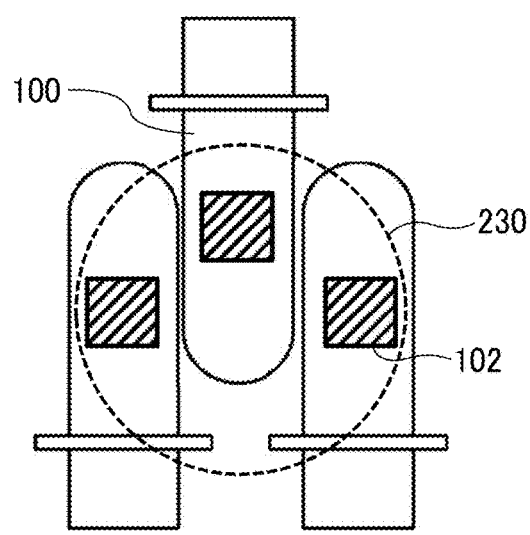
FIG. 24 is a diagram of a laser processing method as an example in the present embodiment.

FIG. 24 is a diagram of a laser processing method as an example in the present embodiment. In the laser emission to the preform, the space between the preform and the laser light source may be wider due to the layout such as the holding.

In particular, when the laser scanning is used to form the mark, a mark area is widened by taking a distance from a lens longer. As illustrated in FIG. 24, one scanning laser light (i.e., single laser light scanning) forms the marks on the multiple preforms by taking the distance from the lens longer and by using the maximum lens performance. As a result, productivity is increased. The single laser light scanning reduces the number of the light source.

Figure 25:
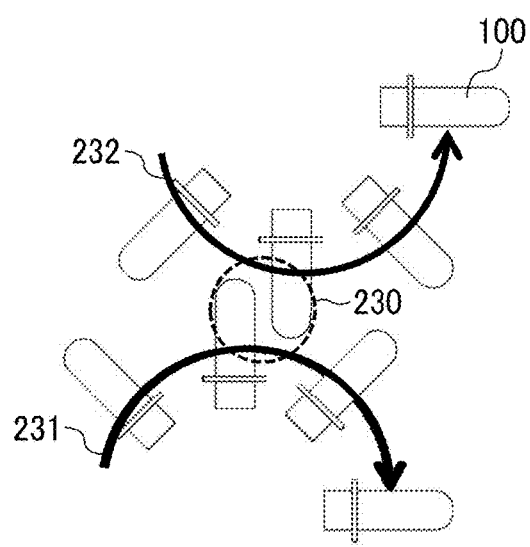
FIG. 25 is a diagram of a laser processing method as another example in the present embodiment.

FIG. 25 is a diagram of a laser processing method as an example in the present embodiment. One laser processing apparatus (laser marking apparatus) forms the marks on multiple preforms of multiple production lines. Accordingly, the number of the laser marking apparatus per production line and the laser light source per production line are reduced.

Figure 26:
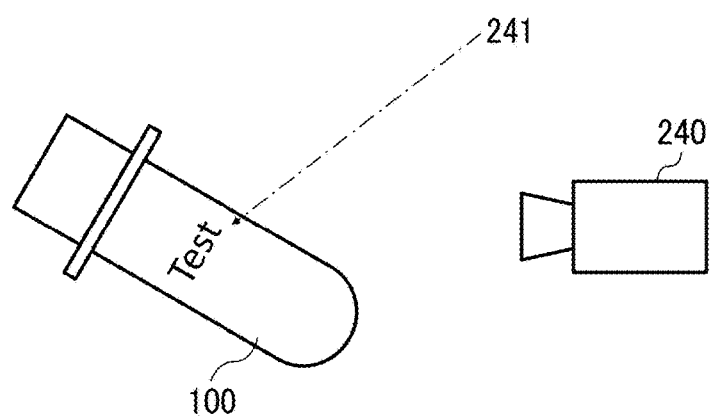
FIG. 26 is a diagram of a laser processing method as another example in the present embodiment.

FIG. 26 is a diagram of a laser processing method as an example in the present embodiment. In a case where multiple production lines of the laser processing, preferably the laser light is visible light recognizable by an ordinary camera for safety. Preferably, a visible laser light source that emits pulse light having a nanosecond-order pulse is used to process resin material. Specifically, when the laser light has a wavelengths of 0.4 µm to 0.7 µm and a pulse width of 1 microsecond (ms) or less, the laser processing is performed, and a normal camera recognizes the laser light as illustrated in FIG. 26.

Figure 27:
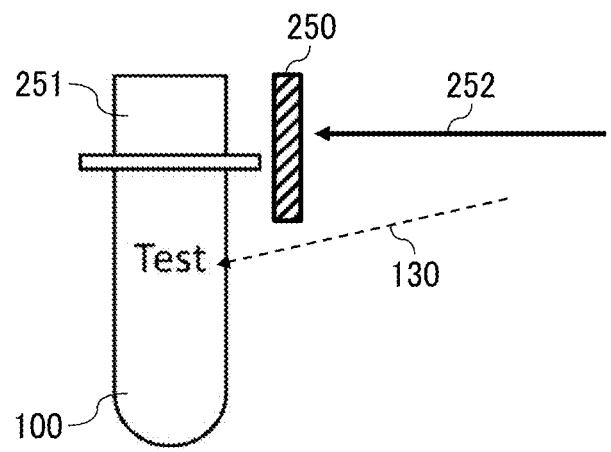
FIG. 27 is a diagram of a laser processing method as =another example in the present embodiment.

FIG. 27 is a diagram of a laser processing method as an example in the present embodiment. When the laser scanning system for the laser processing scans a wider area than the mark in a case where the distance between the laser scanning system and the preform is longer, the laser light 252 is likely to hit the cap portion 251 of the preform 100 because the mark and the cap portion 251 is closer. If the laser light processes the cap portion 251, the cap does not work properly after blow molding to form the molded product. In the present embodiment, the shield 250 is arranged in the vicinity of the cap portion 251 to prevent the laser light 252 from hitting the cap portion in the laser processing. Thus, the cap portion of the molded product after blow molding works properly.

Figure 28:
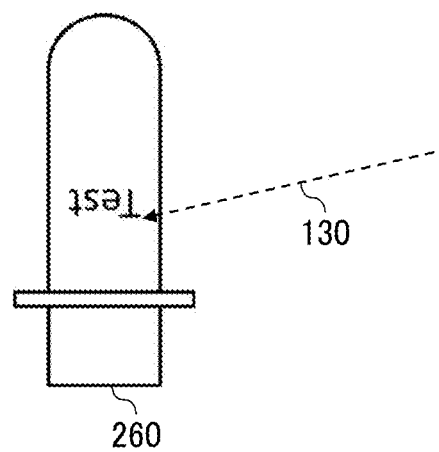
FIG. 28 is a diagram of a laser processing method as another example in the present embodiment.

FIG. 28 is a diagram of a laser processing method as an example in the present embodiment. In the marking by laser emission, backwash such as gas generated by vaporization of the preform is generated and flows into the inside of the preform As illustrated in FIG. 28, the mark is formed with the opening of the preform tilted against the gravity to prevent the backwash from flowing into the inside of the preform. The arrangement of the opening of the preform illustrated in FIG. 28 is not limited thereto as long as the opening is tilted to the direction of the gravity from the horizontal.

In the present embodiment and modifications, the preform is not limited to being transparent. For example, the preform may be opaque as long as the contrast of the mark is developed. In the present embodiment and the modifications, the opaque preform develops the contrast because the mark includes the concave.

As described above, the laser processing method according to present embodiments forms the mark including the concave on the preform. Accordingly, the shape of the mark formed on the preform is maintained in the molded product.

In the first aspect, a laser processing method includes: marking multiple concaves on a surface of a preform before blow molding.

According to the second aspect, the entire mark is less likely to be deformed in blow molding.

In the second aspect, in the laser processing method according to the first aspect, the marking forms a convex in a periphery of each of the multiple concaves.

According to the first aspect, the laser processing method, in which the shape of the mark formed on the preform before blow molding is surely maintained in the molded product after blow molding is provided.

In the third aspect, in the laser processing method according to the first aspect or the second aspect, the marking forms at least two concaves of the multiple concaves separated with each other.

In the fourth aspect, in the laser processing method according to the first aspect or the second aspect, the marking forms at least two concaves of the multiple concaves partially overlapped with each other.

According to the third aspect, the laser processing method that forms uniformly whitened mark is provided.

In the fifth aspect, in the laser processing method according to any one of the first aspect to the third aspect, the marking continuously forms at least two concaves of the multiple concaves, and a first center-to-center distance between the two concaves in a first direction having a first expansion ratio of the preform is narrower than a second center-to-center distance between the two concaves in a second direction having a second expansion ratio of the preform. The first expansion ratio is higher than the second expansion ratio. The first expansion ratio and the second expansion ratio are determined by expanding the preform by blow molding.

According to the fifth aspect, the laser processing method provides that the molded product in which the mark is uniformly whitened in the directions having different expansion ratios is provided.

In the sixth aspect, in the laser processing method according to the fifth aspect, the first direction is orthogonal to the second direction.

In the seventh aspect, in the laser processing method according to any one of the first aspect to the sixth aspect, the marking forms one concave of the multiple concaves adjacent to other of the multiple concaves in multiple directions.

According to the seventh aspect, the laser processing method provides the molded product in which the marking is uniformly whitened in multiple directions.

In the eighth aspect, in the laser processing method according to any one of the first aspect to the seventh aspect, the marking forms on concave of the multiple concaves adjacent to other of the multiple concaves surrounding the one concave.

According to the eight aspect, the laser processing method provides the molded product in which the mark is uniformly whitened in any directions.

In the ninth aspect, in the laser processing method according to any one of the first aspect to the eighth aspect, the marking continuously forms at least two concaves of the multiple concaves, and an unprocessed region between said two concave is 0.2 mm or less on the preform before blow molding.

According to the ninth aspect, the laser processing method provides the molded product in which the mark is uniformly whitened.

In the tenth aspect, in the laser processing method according to any one of the first aspect to the ninth aspect, each of the multiple concaves has a U-shaped cross section.

According to the tenth aspect, the boundary between the preform surface and the mark surface adjacent each other is clear, and the mark surface is not in contact with the mold. Thus, the shape of the mark formed on the preform is maintained in the molded product.

In the eleventh aspect, the laser processing method according to any one of the first aspect to the ninth aspect further includes marking multiple concaves on the surface of the preform after blow molding.

According to the eleventh aspect, a laser processing method that achieves a finer mark forming at higher speed and productivity is provided.

In the twelfth aspect, a preform has the multiple concaves formed by the laser processing according to any one of the first aspect to the eleventh aspect.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

The invention claimed is:

1. A laser processing method comprising:
    marking multiple concaves on a surface of a preform before blow molding; and
    marking multiple concaves on the surface of the preform after the blow molding.

2. The laser processing method according to claim 1,
    wherein the marking before the blow molding forms a convex in a periphery of each of the multiple concaves.

3. The laser processing method according to claim 1,
    wherein the marking before the blow molding forms at least two concaves of the multiple concaves separated with each other.

4. The laser processing method according to claim 1,
    wherein the marking before the blow molding forms at least two concaves of the multiple concaves partially overlapped with each other.

5. The laser processing method according to claim 1,
wherein the marking before the blow molding continuously forms at least two concaves, and a first center-to-center distance between the two concaves in a first direction having a first expansion ratio of the preform is narrower than a second center-to-center distance between the two concaves in a second direction having a second expansion ratio of the preform, the first expansion ratio being higher than the second expansion ratio,
where the first expansion ratio and the second expansion ratio are determined by expanding the preform by blow molding.

6. The laser processing method according to claim 5,
wherein the first direction is orthogonal to the second direction.

7. The laser processing method according to claim 1,
wherein the marking before the blow molding forms one concave of the multiple concaves adjacent to other of the multiple concaves in multiple directions.

8. The laser processing method according to claim 1,
wherein the marking before the blow molding forms one concave of the multiple concaves adjacent to other of the multiple concaves surrounding the one concave.

9. The laser processing method according to claim 8,
wherein the marking before the blow molding continuously forms at least two concaves of the multiple concaves, and
an unprocessed region between said two concaves is 0.2 mm or less on the preform before blow molding.

10. The laser processing method according to claim 1,
wherein each of the multiple concaves marked before the blow molding has a U-shaped cross section.

11. A preform having the multiple concaves formed by the laser processing method according to claim 1.

12. The laser processing method according to claim 1, wherein:
the marking of the multiple concaves on the surface of the preform before the blow molding uses a laser having a first pulse width, and
the marking of the multiple concaves on the surface of the preform after the blow molding uses a laser having a second first pulse width which is different from the first pulse width.

13. The laser processing method according to claim 1, wherein:
the marking of the multiple concaves on the surface of the preform after the blow molding marks a total area of the multiple concaves to be smaller than a total area of the multiple concaves marked on the surface of the preform before blow molding.

* * * * *